(12) United States Patent
Giorgi et al.

(10) Patent No.: US 9,797,785 B2
(45) Date of Patent: Oct. 24, 2017

(54) ENVIRONMENTAL CONDITION SURVEILLANCE AND METHODS THEREOF

(71) Applicant: Magnum Energy Solutions, LLC, Hudson, OH (US)

(72) Inventors: Michael E. Giorgi, Hudson, OH (US); Jorge E. Saenz, Weston, FL (US)

(73) Assignee: Magnum Energy Solutions, LLC, Hudson, OH (US)

( * ) Notice: Subject to any disclaimer, the term of this patent is extended or adjusted under 35 U.S.C. 154(b) by 0 days.

(21) Appl. No.: 14/730,214

(22) Filed: Jun. 3, 2015

(65) Prior Publication Data

US 2015/0355036 A1    Dec. 10, 2015

Related U.S. Application Data

(60) Provisional application No. 62/007,666, filed on Jun. 4, 2014.

(51) Int. Cl.
| | |
|---|---|
| *G01K 13/00* | (2006.01) |
| *G01K 7/22* | (2006.01) |
| *G05B 15/02* | (2006.01) |
| *H04L 12/28* | (2006.01) |
| *G01K 1/02* | (2006.01) |

(52) U.S. Cl.
CPC ............ *G01K 13/00* (2013.01); *G01K 1/022* (2013.01); *G01K 7/22* (2013.01); *G05B 15/02* (2013.01); *H04L 12/2816* (2013.01); *H04L 12/2825* (2013.01)

(58) Field of Classification Search
CPC .......... G01K 13/00; G01K 7/22; G01K 1/022; G05B 15/02; H04L 12/2816; H04L 12/2825

USPC ........................................................ 702/130
See application file for complete search history.

(56) References Cited

U.S. PATENT DOCUMENTS

| | | | |
|---|---|---|---|
| 2002/0050932 A1* | 5/2002 | Rhoades ............ | G08B 13/1965 340/870.16 |
| 2003/0132303 A1 | 7/2003 | Gatling et al. | |
| 2008/0231454 A1 | 9/2008 | Curcio | |
| 2011/0193710 A1* | 8/2011 | McIlvain .................. | B60P 3/20 340/585 |
| 2012/0198866 A1 | 8/2012 | Zeidner | |

(Continued)

OTHER PUBLICATIONS

Cigoy, How to select the right tempearture sensor, Jun. 2007.*

(Continued)

*Primary Examiner* — Michael Nghiem
*Assistant Examiner* — Peter Ngo
(74) *Attorney, Agent, or Firm* — Amin, Turocy & Watson, LLP

(57) ABSTRACT

A surveillance platform for the sensing, measuring, monitoring and controlling equipment and environments, such as food storage and retailing environments, data center environments, and other environments in which equipment performance, operating status, and environmental condition monitoring is desirable, is provided. The surveillance platform can facilitate reporting, visualizing, acknowledging, analyzing, calculating, event generating, notifying, trending, and tracking, of operational events occurring within the environment. Such techniques can be used to protect articles such as food articles, medical articles, computing devices and equipment, artifacts, documents, and the like.

19 Claims, 7 Drawing Sheets

(56) References Cited

U.S. PATENT DOCUMENTS

| | | | |
|---|---|---|---|
| 2012/0215464 A1* | 8/2012 | Daubney | G01K 17/06 702/24 |
| 2013/0169443 A1 | 7/2013 | Schechter | |
| 2013/0204402 A1* | 8/2013 | Mezic | G05B 15/02 700/28 |
| 2014/0075015 A1* | 3/2014 | Chan | H04L 41/046 709/224 |

OTHER PUBLICATIONS

International Search Report and Written Opinion received for International Application No. PCT/US2015/034132, mailed Nov. 19, 2015, 10 pages.

\* cited by examiner

ENVIRONMENTAL CONDITION SURVEILLANCE AND METHODS THEREOF

CROSS-REFERENCE TO RELATED APPLICATION

This application claims the benefit of U.S. provisional patent application Ser. No. 62/007,666, filed on Jun. 4, 2014, entitled, ENVIRONMENTAL CONDITION SURVEILLANCE AND METHODS THEREOF, the disclosure of which is hereby incorporated by reference in its entirety.

BACKGROUND

Climate controlled environments are created in a number and variety of settings and locations. Typical climate controlled environments may include, but are not limited to, data center environments, health care environments, manufacturing and production environments, retail environments, food service environments, and food retail and warehousing environments, such as supermarkets and convenience stores. Various environments may have sub-environments, which each may have individual climate control requirements. For example, in supermarkets and convenience stores, refrigerated display cases, coolers, and freezers can each be a sub-environment having environmental condition requirements. A datacenter may have a plurality of sub-environments, with each sub-environment housing one or more racks or other computing equipment. The temperature and humidity of each sub-environment in a datacenter typically controlled in an effort to maintain proper operating conditions for the computer hardware. The conditions of climate controlled environments are typically monitored through the use of various types of wired or wireless sensors that are deployed within the environment. The amount of data collected from an environment is often limited by the number of sensors, type of sensors, location of the sensors, and whether the sensors are operational. In the example context of a refrigerated case at a retail location, a single temperature sensor is typically placed in the air discharge area to monitor and/or control the temperature for the entire case. A single temperature point cannot typically reflect true temperature dynamics across the case, nor does a single sensor (or small sensor set) enable for service technicians to easily identify root causes of problems for diagnostic purposes.

While increasing the number of sensors deployed into an environment can increase the accuracy and functionality of an environmental monitoring system, adding sensors into an environment poses numerous operational challenges. For example, for existing structures, installing additional "aftermarket" wired sensors presents installation issues, as control wiring must typically be routed from the sensor in the sub-environment to a centralized control system. For structures under construction, wiring runs must still be installed to connect each sensor to a centralized control system. In both instances, running such control wiring can be complex, labor intensive, and costly. Using wireless sensors does not necessarily mitigate the issues. Wireless sensors are typically battery operated or utilize energy harvesting techniques, such as solar power. In both cases, the wireless sensors are typically placed inside the climate controlled environment. For battery-based sensors, due to the operating conditions of the sensors (e.g., low temperatures, humidity, condensation, etc.), the battery life can be reduced, thereby undesirably requiring frequent replacement, or otherwise resulting in non-operation sensors. For sensors that are equipped with energy harvesting techniques, the placement of the sensor may not expose the sensor to the necessary amount of ambient lighting necessary to sufficiently power the sensor.

Thus, it would be advantageous to provide for environmental condition surveillance systems and methods that address one or more of these issues. Indeed, it would be advantageous to provide for a system facilitating deployment of numerous sensors within an environment while reducing the challenges typically faced during sensor installation and operation.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
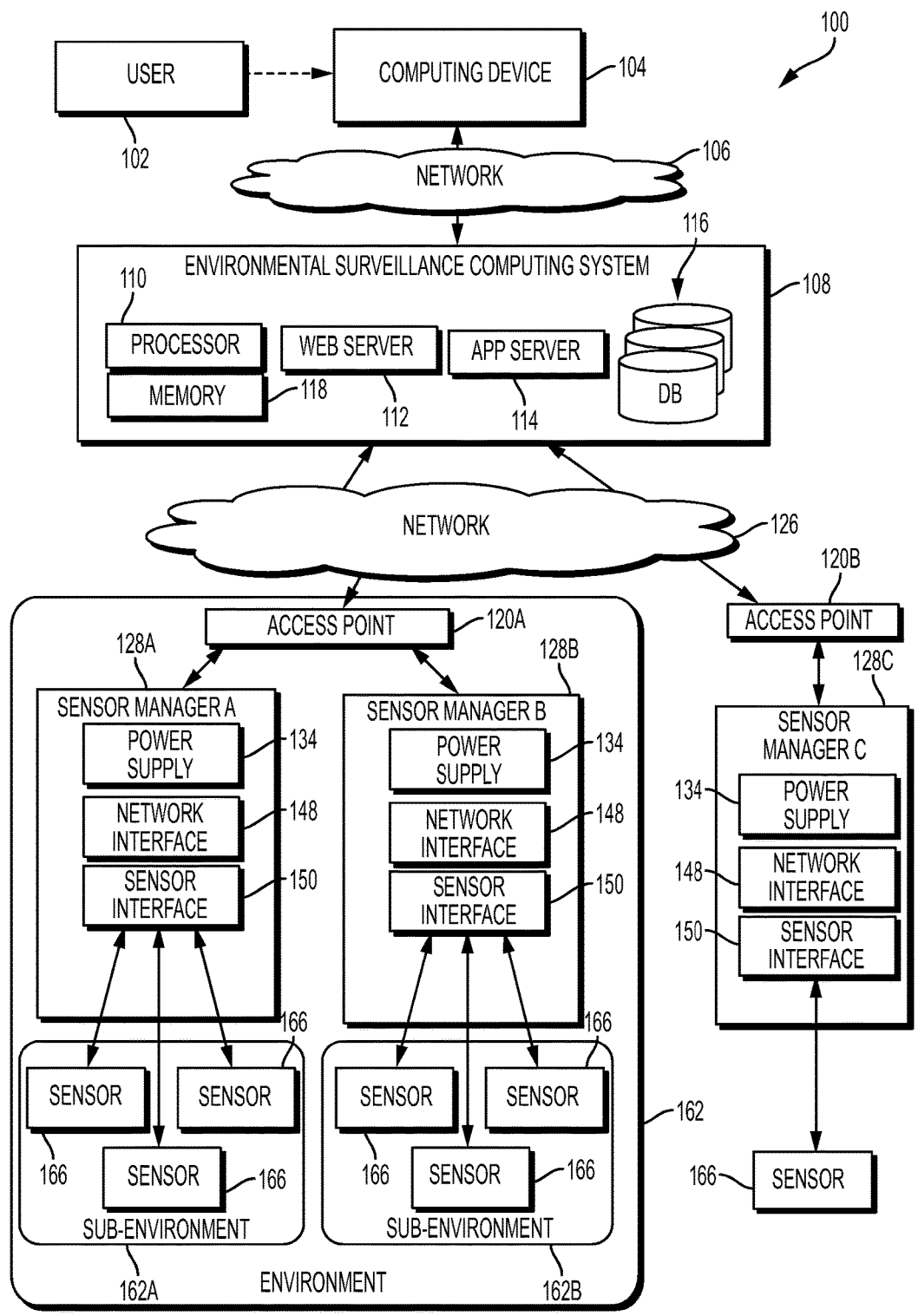
FIGS. 1-4 depict simplified example block diagrams of example environmental surveillance platforms.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-8 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

The systems, apparatuses, devices, and methods disclosed herein generally relate to providing a surveillance platform for the sensing, measuring, monitoring and controlling equipment and environments, such as food storage and retailing environments, data center environments, and other environments in which equipment performance, operating status, and environmental condition monitoring is desirable. Additional activates facilitated by the surveillance platform can include, for example, reporting, visualizing, acknowledging, analyzing, calculating, event generating, notifying, trending, and tracking, which are described in more detail below. The term "protected article" is used herein to represent any object, service, or system that is stored in, operating in, or otherwise present in a climate controlled environment. Example protected articles can include, without limitation, food articles, medical articles, computing devices and equipment, artifacts, documents, and the like. As is to be appreciated upon consideration of the present disclosure, the systems, apparatuses, devices, and methods described herein can be used with a wide variety of protected articles, some of which are described below for illustrative purposes.

Generally, the surveillance platform comprises one or more data capturing elements, probes, and/or gauges, generally referred to herein as "sensors." The sensors can be configured to generate signals or otherwise indicate any number of environmental conditions, such as temperature, humidity, pressure, sound levels, air flow, carbon dioxide levels, air quality levels, power consumption levels, lighting levels, current levels, voltage levels, and so forth. By way of example, in one example embodiment, a sensor can be a negative temperature coefficient (NTC) 10 KΩ thermistor probe, or other type of industry-standard sensor.

In some embodiments, the sensors can be in communication with a sensor manager. Any suitable communication protocols or technique can be used to facilitate data communication between the sensor and the sensor manager. For example, a sensor can include a lead that is inserted into a port of the sensor manager. Alternatively, some sensors can wirelessly communicate with the sensor manager through any number of suitable wireless communication techniques, such as WiFi, Zigbee, or any number of other near-field communication protocols. In some embodiments, a sensor manager can be in communication with up to 10 sensors, while in other embodiments, a sensor manager can be in communication with more than 10 sensors. A sensor manager can also be in communication with a plurality of sensors types, such as one or more temperature sensors, one or more pressure sensors, and so forth. Furthermore, in some embodiments, one or more sensors can be onboard the sensor manager itself. Depending on the type of environment being monitored, a plurality of sensor managers can be deployed. The sensor manager can be positioned within the controlled environment or outside the controlled environment. For sensor managers positioned outside the controlled environment, the one or more sensors in communication with the sensor manager can be deployed inside the controlled environment. By way of example, one or more sensors can be positioned inside a low-temperature environment (i.e., freezer, cooler, refrigerator, etc.) and be in communication with a sensor manager that is positioned external to the low-temperature environment. In this case, the operational lifespan of the sensor manager may be increased, as it is not exposed to the environmental conditions that could adversely impact its performance. The sensors deployed within the low-temperature environment, however, can generally be more robust and configured for long term use in such environments.

A variety of power sources can be used to operate a sensor manager such as, for example, an on-board energy harvester. In one embodiment, the energy harvester comprises a photovoltaic module, such as a solar panel. In some cases, a battery supply back-up can be used to augment the power delivered to the sensor manager from the on-board energy harvester. A battery supply back-up can be used, for example, in environments having sporadic lighting levels, such as a data center. The use of on-board energy harvesting and/or battery power supplies can enable the sensor manager to be placed proximate to a particular environment without needing to run additional wiring for power. In other embodiments, however, sensor managers can be powered by an AC or DC power generation sources via suitable wiring or power transformers.

The sensor manager can be in wireless communication with an access point (AP). In one embodiment, the sensor and the access point communicate over a WiFi network. The AP can be a receiver for any number of sensor managers. In some embodiments, since the sensor manager is in wireless communication with the AP, the inconvenience of installing additional communication cabling for environmental condition monitoring is reduced or eliminated. The AP can receive power from any suitable source, such as a power adaptor or using Power over Ethernet (PoE) techniques, for example. Generally, the AP can collect the data gathered from the sensors and forward it to an environmental surveillance computing system through an Ethernet port to a local area network (LAN) or through the Internet via a router. In some embodiments, communication protocols can be utilized that are designed to minimize, or at least reduce, the amount of energy needed to transmit a signal to a receiver. Example environmental surveillance computing systems are described in more detail below.

In some embodiments, the AP can be configured to provide certain functionality in the event of a communication link failure or other types of networking issues. For example, in the event the AP loses communication with the environmental surveillance computing system, the AP can locally store data collected from the sensor managers in a data store. Upon reconnection to the environmental surveillance computing system, the AP can then transmit this data to the environmental surveillance computing system. In this approach, the environmental surveillance computing system can still collect relevant data from monitored environments, even if the communications link between the environmental surveillance computing system and the AP experiences outages or downtime.

Through an environmental surveillance computing system personnel can access and view the data associated with one or more climate controlled environments, as well receive alerts of various events and conditions. The environmental surveillance computing system can be accessed, for example, through any type of suitable computing device, such as a laptop computer, a desktop computer, a mobile computer (such as a smart phone or a tablet computer), and so forth. In some embodiments, an environmental surveillance computing system is a component of a building automation or management computing system. Additionally or alternatively, cellular networks can be utilized to provide transmission of data from the sensors to the environmental surveillance computing systems.

Environmental surveillance computing systems in accordance with the present disclosure can provide a graphical user interface to users. Example types of users can include, without limitation, store personnel, service and maintenance personnel, food quality or risk management personnel, security personnel, audit personnel, and so forth. Through the interface, current and historical environmental conditions and other related data can be graphically displayed. Events, such as overheating, overcooling, high humidity, and so forth, can be displayed to the user and, in some cases, request user action. Data can be logged, reports can be generated, and diagnostics can be performed. Among other benefits, using the data collected and displayed by the environmental surveillance computing system, the root cause of an alarm can be assessed to help aid in the determination of whether a service person should be dispatched.

In some embodiments, the AP can be configured to monitor and instigate various alarms, alerts or other notifications during periods of time when communication to the environmental surveillance computing system is interrupted. In this way, even if there is a communication link failure, at least some detected conditions can trigger localized alarms so that appropriate personnel can address the issue, if needed.

Using the systems and methods described herein, the condition of a protected article's environment can be monitored in real-time or near real-time. In the context of food-based protected articles, the systems, apparatuses, devices, and methods described herein can assist in maintaining the freshness and quality of food products by helping to quickly identify and address temperature or operational issues. In turn, food waste and food safety risks can be reduced. In the context of data centers, the systems, apparatuses, devices, and methods described herein can be advantageously used to identify hot spots, over cooled areas, equipment overloading, effectiveness of raised floor strategy, and optimal equipment positioning (such as AC units) to balance temperatures across the data center. Furthermore, sensor managers for data centers can be integrated with a building's automation system through the use of BACnet communication protocols, for example. In some embodiments, the sensor manager can include on-board sensors, such as a humidity sensor or a door ajar sensor, to aid in the monitoring of environmental conditions.

FIG. 1 depicts a simplified example block diagram 100 of an example environmental surveillance computing system 108 in communication with various access points 120A, 120B. Merely for the purposes of illustration, two access points are illustrated, with access point 120A associated with an environment 160. The environment 160 can be, for example, a retail location having sub-environments 162A, 162B. The sub-environments 162A, 162B can be climate controlled areas, such as refrigerated food merchandisers, freezers, or other low-temperature zones. Each access point 120A, 120B is shown to be in communication with at least one sensor manager, shown as sensor managers 128A, 128B, and 128C. Each sensor manager 128A, 128B, and 128C can be in communication with one or more sensors 166. As described above, the sensors 166 can provide data, in the form of a signal, for example, to the respective sensor manager. This data can be provided wirelessly or through a wired connection. In some embodiments, sensors are positioned within the sub-environment while the sensor manager associated with the sensor is positioned external to the sub-environment. Using this configuration, the sensor manager is not exposed to operational conditions that may negatively impact its lifespan, such as low temperatures, condensation, high humidity levels, etc. In other embodiments, however, the sensor manager is positioned internal to the sub-environment, along with the sensors with which it communicates.

Each sensor manager 128A, 128B, and 128C can have a power supply 134. In some embodiments, the power supply 134 can utilize energy harvesting technology, such as solar panels, so that external power sources are not needed. In other embodiments, the sensor manager can receive power from a power adapter. In yet other embodiments, the power supply 134 can utilize a back-up power supply, such as an on-board battery, along with the energy harvesting technology. The sensor managers 128A, 128B, and 128C can also have a network interface 148 for facilitating wireless communication with the respective access point 120A, 120B. As shown, the sensor managers 128A, 128B, and 128C can also have a sensor interface 150, such as data ports, for facilitating communication with the sensors 160.

The environmental surveillance computing system 108 can be in communication with the access points 120A, 120B over one or more networks 126, including both wireless and wireline communication networks. The environmental surveillance computing system 108 can be provided using any suitable processor-based device or system, such as a personal computer, laptop, server, mainframe, mobile computer, other processor-based device, or a collection (e.g. network) of multiple computers, for example. The environmental surveillance computing system 108 can include one or more processors and one or more memory units. For convenience, only one processor 110 and only one memory unit 118 are shown in FIG. 1. The processor 110 can execute software instructions stored on the memory unit 118. The processor 110 can be implemented as an integrated circuit (IC) having one or multiple cores. The memory unit 118 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 118 can store executable software and data. When the processor 110 of the environmental surveillance computing system 108 executes the software instructions, the processor 110 can be caused to perform the various operations of the environmental surveillance computing system 108. The various operations of the environmental surveillance computing system 108 can include communicating with the access points 120A, 120B, receiving data collected from the sensors 166, processing the data, as well as providing various types of graphical interfaces and portals for accessing and managing data stored or processed by the environmental surveillance computing system 108, as described in more detail below.

The environmental surveillance computing system 108 can store and access data in a variety of databases 116 of a data acquisition server, for example. The data stored in the databases 116 can be stored in a non-volatile computer memory, such as a hard disk drive, read only memory (e.g. a ROM IC), or other types of non-volatile memory. In some embodiments, one or more databases of the databases 116 can be stored on a remote electronic computer system and can be accessed by the environmental surveillance computing system 108 via the network 126. As one having ordinary skill in the art would appreciate, a variety of other databases or other types of memory storage structures can be utilized or otherwise associated with the environmental surveillance computing system 108.

Also shown in FIG. 1, the environmental surveillance computing system 108 can include one or more computer servers, which can include one or more web servers, one or more application servers, and/or other types of servers. For convenience, only one web server 112 and one application server 114 are depicted in FIG. 1, although one having ordinary skill in the art would appreciate that the disclosure is not so limited. The servers 112, 114 can cause content to be sent to a computing device 104, or other computing devices, via the network 106 in any of a number of formats. The servers 112, 114 can be comprised of processors (e.g. CPUs), memory units (e.g. RAM, ROM), non-volatile storage systems (e.g. hard disk drive systems), and other elements. The servers 112, 114 may utilize one or more operating systems including, but not limited to, Solaris, Linux, Windows Server, or other server operating systems.

In some embodiments, the web server 112 can provide a graphical web user interface through which various users 102 can interact with the environmental surveillance computing system 108, examples of which are described in more detail below with regard to FIGS. 4-6. As provided above, example users 102 can include, without limitation, store personnel, service and maintenance personnel, food quality or risk management personnel, security personnel, audit personnel, and so forth. The graphical web user interface can also be referred to as a graphical user interface, client portal, alert interface, client interface, graphical client interface, and so forth. The web server 112 can accept requests, such as HTTP requests, from clients and serve the clients responses, such as HTTP responses, along with optional data content, such as web pages (e.g. HTML documents) and linked objects (such as images, video, documents, data, and so forth). The application server 114 can provide a user interface for users who do not communicate with the environmental surveillance computing system 108 using a web browser. Such users can have special software installed on their computing device to allow the user to communicate with the application server 114 via the network 106.

The environmental surveillance computing system 108 can be in communication with the sensors managers 120A, 120B and associated sensors 166 via the network 126. The network 126 can be an electronic communications network and can include, but is not limited to, the Internet, LANs, WANs, GPRS networks, other networks, or combinations thereof. The network 126 can include wired, wireless, fiber optic, other connections, or combinations thereof. In general, the network 126 can be any combination of connections and protocols that will support communications between the environmental surveillance computing system 108 and the various access points 120A, 120B.

Figure 2:
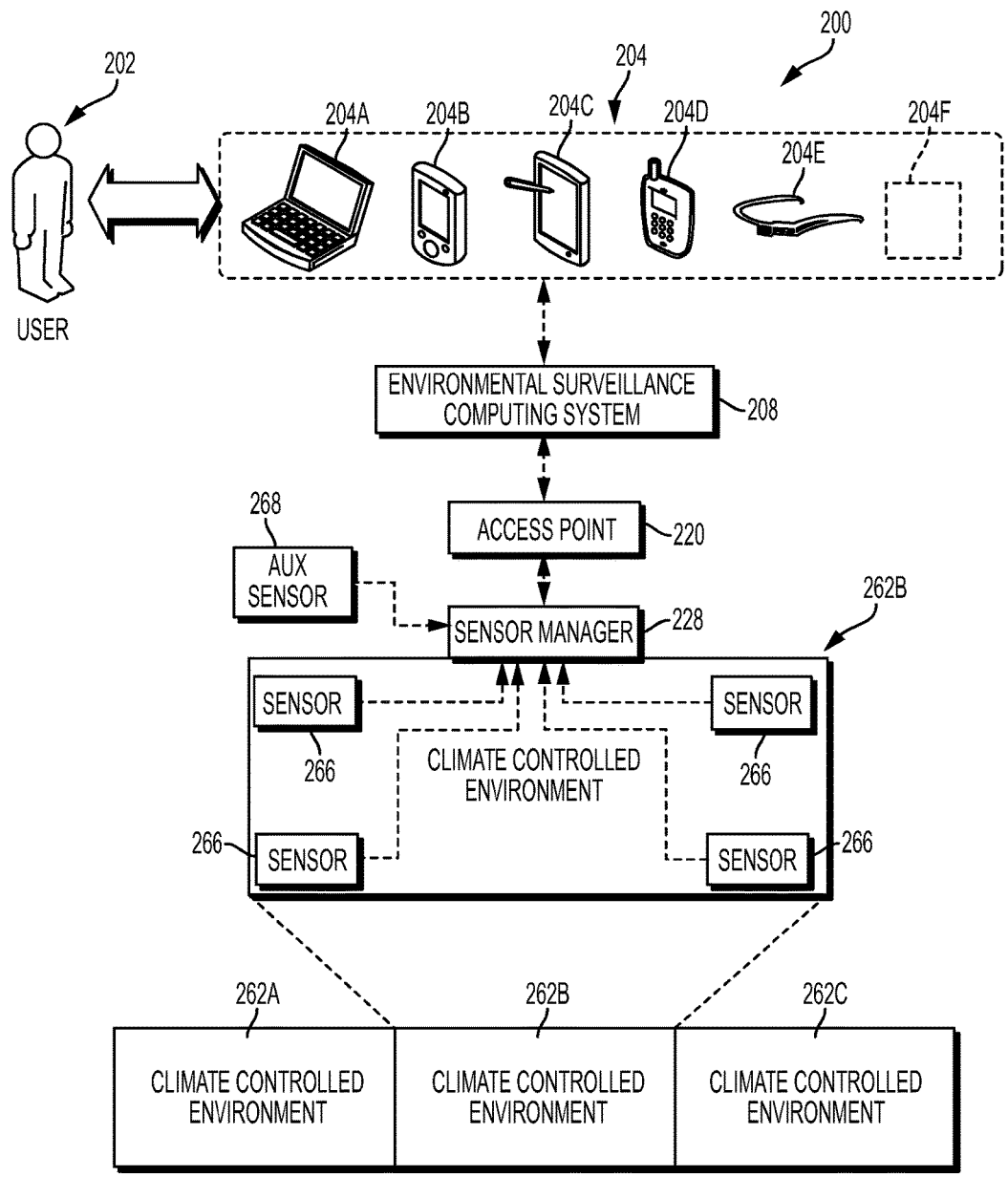

FIG. 2 depicts an example system diagram 200. The system diagram 200 includes element similar to FIG. 1, such as a sensor manager 228 that is in communication with sensors 266, an access point 220, and an environmental surveillance computing system 208. The sensor manager 228 can be powered by, or at least partially powered by, solar energy. In the illustrated embodiment, a bank of climate controlled environments 262A, 262B, 262C are depicted. In embodiments, each climate controlled environment 262A, 262B, 262C can be merchandising equipment at a retailer. As is to be appreciated, the climate controlled environments 262A, 262B, 262C depicted in FIG. 2 can represent a wide variety of environments, such as data center racks, refrigerators, coolers, freezers, and so forth. As shown, a user 202 can interact with the environmental surveillance computing system 208 through a computing device, shown generally at 204. A wide variety of computing devices can be used by the user 202, such as a laptop 204A, a PDA 204B, a tablet computer, 204C, a smartphone 204D, a wearable device 204E, or any other networked computing device 204F.

As depicted in the illustrated embodiment, the sensor manager 228 is in communication with an auxiliary sensor 268. The auxiliary sensor can be any type of sensor that may provide operational insight into an environment. In some implementations, the auxiliary sensor 268 is a door sensor that provides a signal to a digital input on the sensor manager 228. The door sensor can provide useful information when analyzing a root cause of an elevated temperature event in the climate controlled environment 262B. For example, the climate controlled environment 262B may be experiencing elevated temperatures that exceed expected operational ranges. An elevated temperature event can be caused by any number of factors, such as a compressor failure, airflow blockage, etc. In order to perform a root cause analysis, the environmental surveillance computing system 208 can determine whether a door to the climate controlled environment 262B has been open for an extended period of time, which could cause the temperature event. Furthermore, in some embodiments, an alert could be generated based on the door sensor indicating an open door for an excess period of time.

Figure 3:
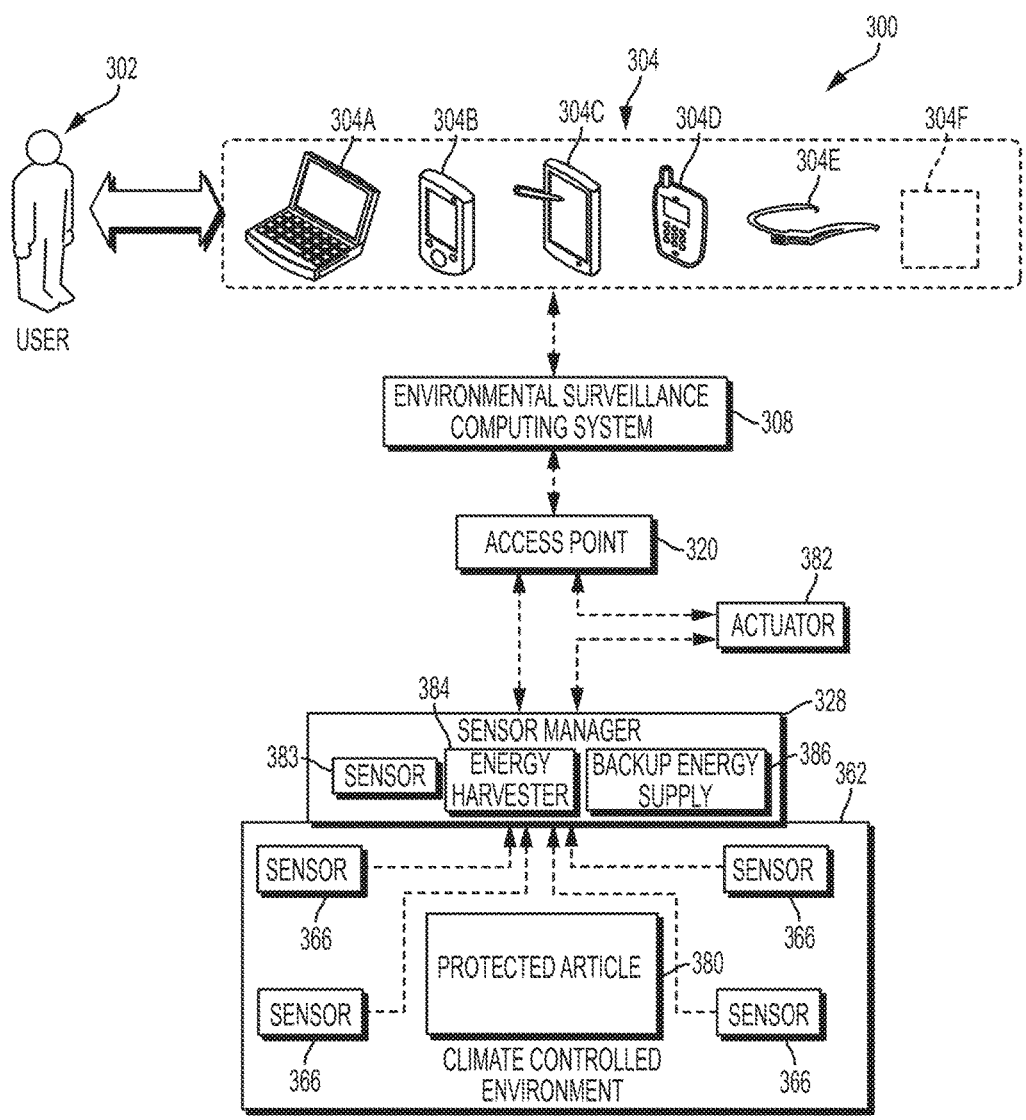

FIG. 3 depicts another example system diagram 300. The system diagram 300 includes element similar to FIG. 1, such as a sensor manager 328 that is in communication with sensors 366, an access point 320 and an environmental surveillance computing system 308. In the illustrated embodiment, a protected article 380 is shown housed within the climate controlled environment 362. As shown, a user 302 can interact with the environmental surveillance computing system 308 through a computing device, shown generally at 304. Similar to FIG. 2, a wide variety of computing devices can be used by the user 302, such as a laptop 304A, a PDA 304B, a tablet computer, 304C, a smartphone 304D, a wearable device 304E, or any other networked computing device 304F. The sensor manager 328 can be positioned internal to the climate controlled environment 362, or positioned external (as shown). In this embodiment, sensor manager 328 includes an on-board sensor 383. This on-board sensor 383 can be, for example, a humidity sensor or other type of sensor that gathers useful data. The sensor manager 328 also includes an energy harvester 384 and a backup energy supply 386. In one embodiment, the access point 320 serves as a gateway to a BACnet communication network. Accordingly, the data gathered from the sensors 366 can be utilized by building automation and systems management systems. In some embodiments, actuators can be used to provide alerts, signals, or other information to personnel proximate to the climate controlled environment 362. For the purposes of illustration, a single actuator 382 is depicted in FIG. 3. The actuator 382 can be activated upon the existing of certain conditions. The conditions may vary based on implementation, but example conditions can include, without limitation, temperature-based conditions, power consumption-based conditions, and so forth. The actuator 382 can be any suitable device or element, such as a graphical element on a display screen, a visual actuator (i.e. light), an audible indicator (i.e., siren, chime), and so forth.

The status of the actuator 382 can be controlled by one or more entities of the system. In some embodiments, the environmental surveillance computing system 308 can cause the activation of the actuator 382 based on environmental conditions being sensed by the sensors 366. In the event of a communication link failure (e.g., the Internet connection between the access point 320 to the environmental surveillance computing system 308), the access point 320 can assume control of the actuator 382. In this regard, the access point 320 can continue to perform all, or at least some, of the environmental condition monitoring and when certain events occur, activate the actuator 382 accordingly. Therefore, even in periods of non-connectivity to the environmental surveillance computing system 308, environment condition monitoring can still proceed, with alerts provided as may be needed.

Figure 4:
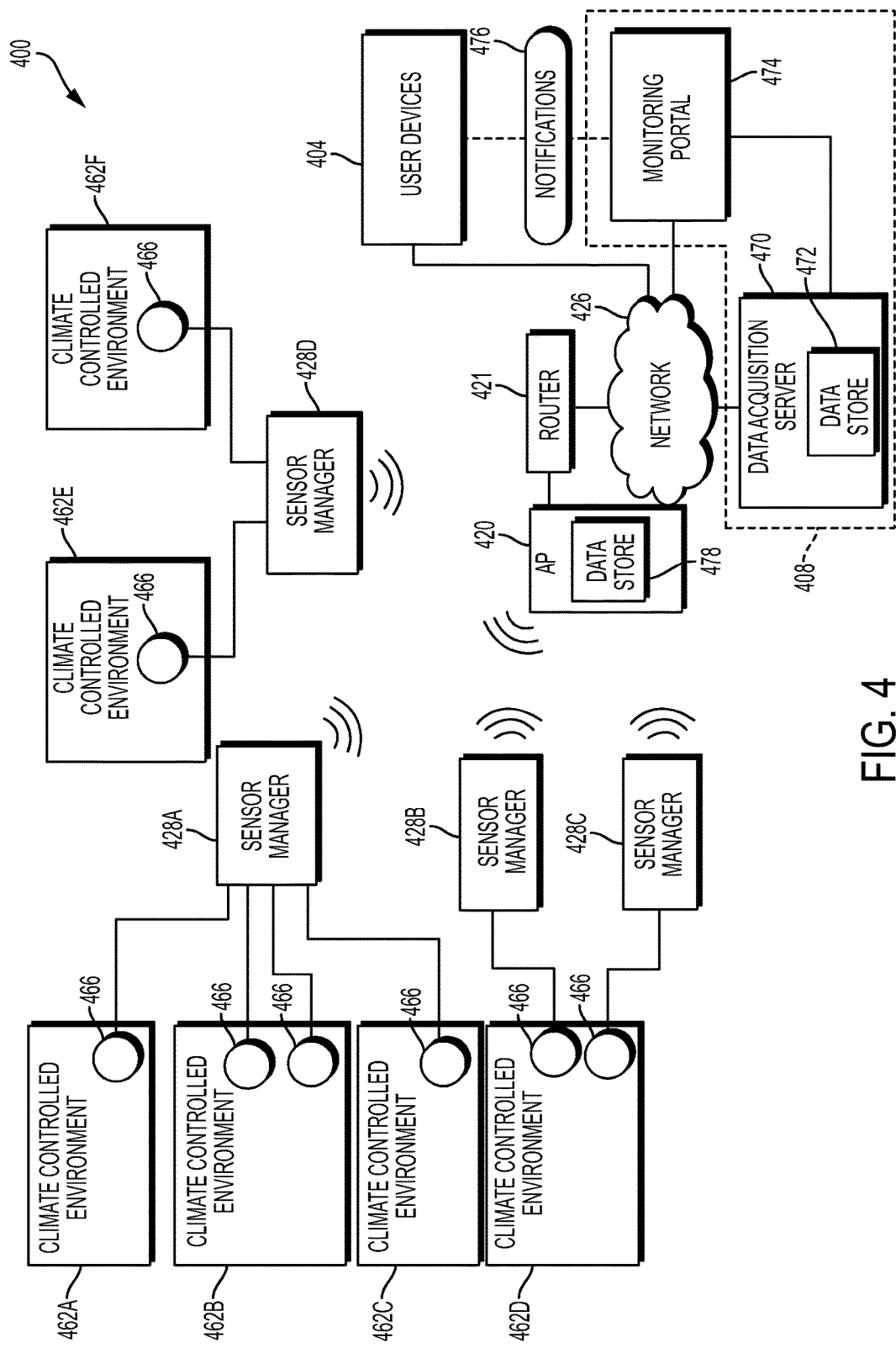

FIG. 4 depicts another example system diagram 400. As shown, a plurality of sensor managers 428A-D are in wireless communication with an access point 420. As is to be appreciated, while one access point 420 is depicted, some structures may use multiple access points to provide the necessary amount of coverage. Each sensor manager 428A-D is associated with one or more climate controlled environments and/or environments in which equipment monitoring is desired. Sensor manager 428A is configured to receive communications from sensors 466 within climate controlled environments 462A-C. Sensor managers 428B-C are configured to receive communications from sensors 466 within climate controlled environment 462D. One sensor deployed within climate controlled environment 462D can be, for example, a temperature sensor and the other sensor can be, for example, a power consumption sensor. Sensor managers 428D is configured to receive communications from sensors 466 within climate controlled environments 462E-F. The access point 420 can include a data store 478 to store some or all of the data received from the sensor managers 428A-D. The access point 420 can communicate with an environmental surveillance computing system 408 via a router 421 and a network 426. In some embodiments, when the communication channel to the environmental surveillance computing system 408 is not operational, the access point 420 continues to collect (and in some cases actively monitor) the data collected by the various sensor managers 428A-D. Once the communication channel connectivity returns, the access point 420 can download the collected data to the environmental surveillance computing system 408.

In the illustrated embodiment, the environmental surveillance computing system 408 comprises a data acquisition server 470 that collects data in a data store 472. A monitoring portal 474 provides visualization of the collected data for viewing on user devices 404, which can also connect to the environmental surveillance computing system 408 via the network 426. In some embodiments, the monitoring portal 474 provides notifications 476 to the user devices 404 by way of one or more delivery techniques, such as text messages, email messages, voicemail messages, instant messages, social media messages, and the like.

In accordance with the present disclosure, a variety of graphical user interfaces can be presented to a variety of users on a variety of different types of computing devices. FIGS. 5-7 depict example simplified graphical user interfaces 500, 600, 700 that can be presented on a display of a computing devices 504, 604, 704, respectively. The graphical user interfaces can be generated by an environmental surveillance computing system (i.e., a web server and/or an app server) and can be provided to a user through an application interface, such as a standalone application or a web browsing application, for example. The graphical user interface 500, 600, 700 can be presented using hypertext markup language (HTML) and Java scripts, or a dedicated applet or application, or any other suitable interfacing means as would be known or understood in the art. The user can be presented with a variety of management, reporting, and/or scheduling tools or options.

Figure 5:
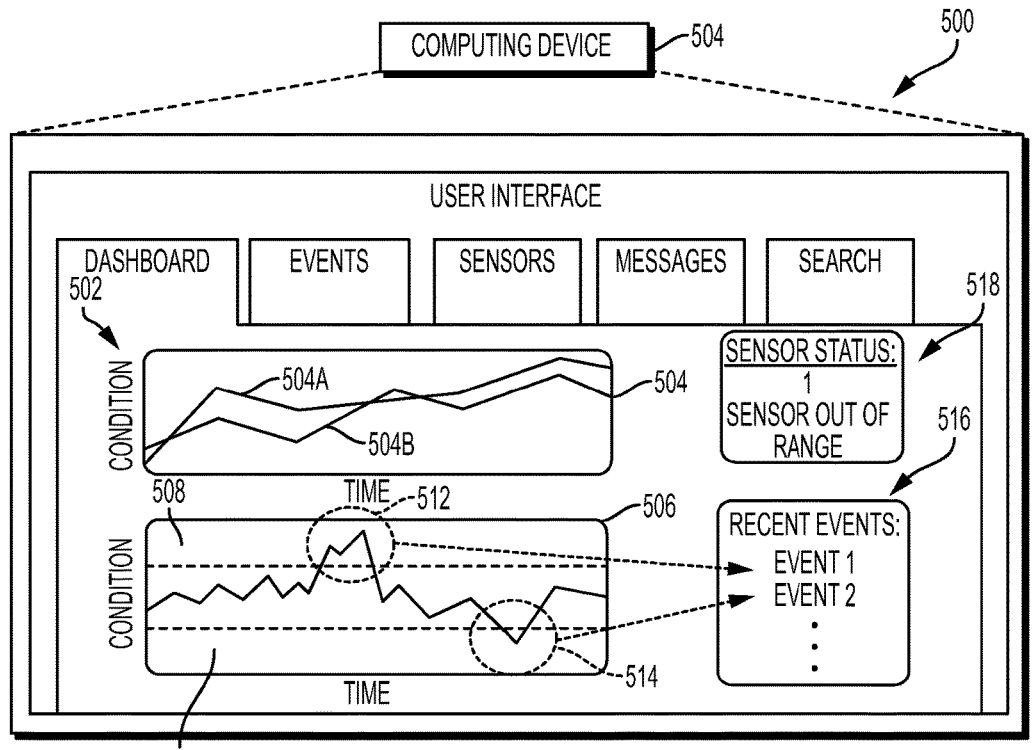
FIGS. 5-7 depict example simplified graphical user interfaces that can be presented on a display of a computing device.

Referring first to FIG. 5, a simplified user dashboard 502 is provided on the user interface 500. As is to be appreciated, the particular content of the dashboard 502 may vary based on the type of user, the type of protected article, the type of climate controlled environment, the type of sensors deployed, and so forth. In any event, in the illustrated example, the dashboard includes graphs that schematically show environmental conditions (such as temperature or humidity, for example) over time. The graph 504 is displaying data from two sensors, as indicated by plots 504A and 504B. The graph 506 depicts sensor data for a particular climate controlled environment, with an overheated zone 508 and an overcooled zone 510. As is to be appreciated, the particular ranges of the overheated zone 508 and an overcooled zone 510 can be configurable. As shown by plot 506A, the data from a sensor indicates that an overheat event 512 has occurred and an overcool event 514 has occurred. In response to detecting these events, a recent event listing 516 is populated. A user of the system can then decide if further action may be required.

Figure 6:
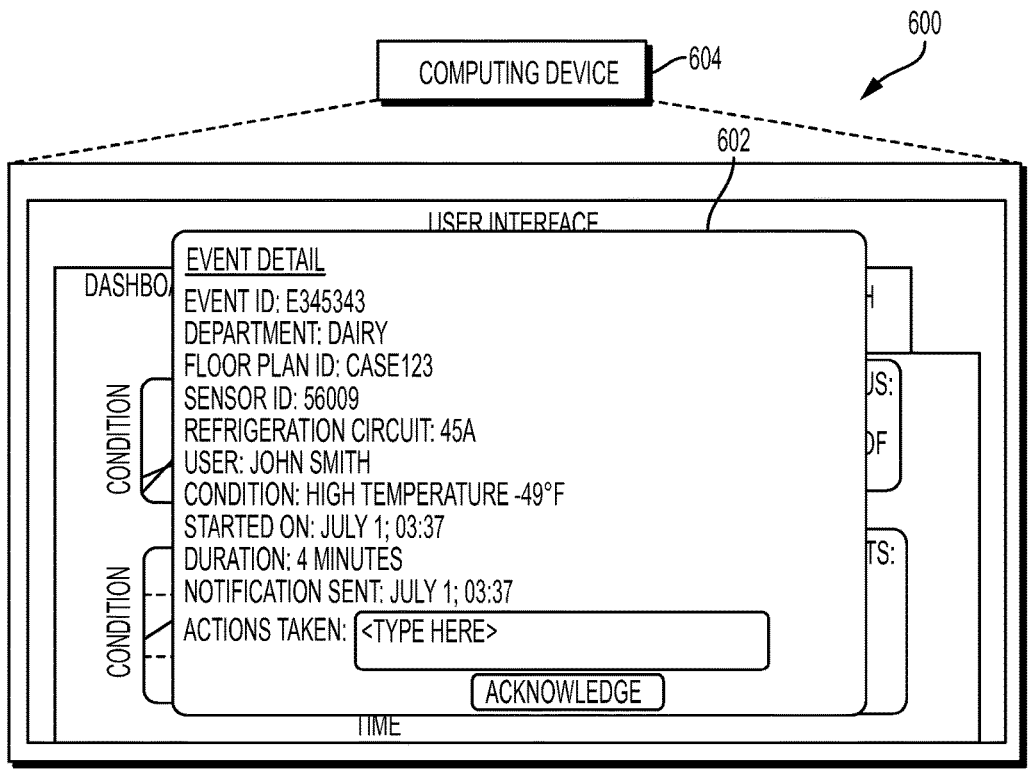
Figure 7:
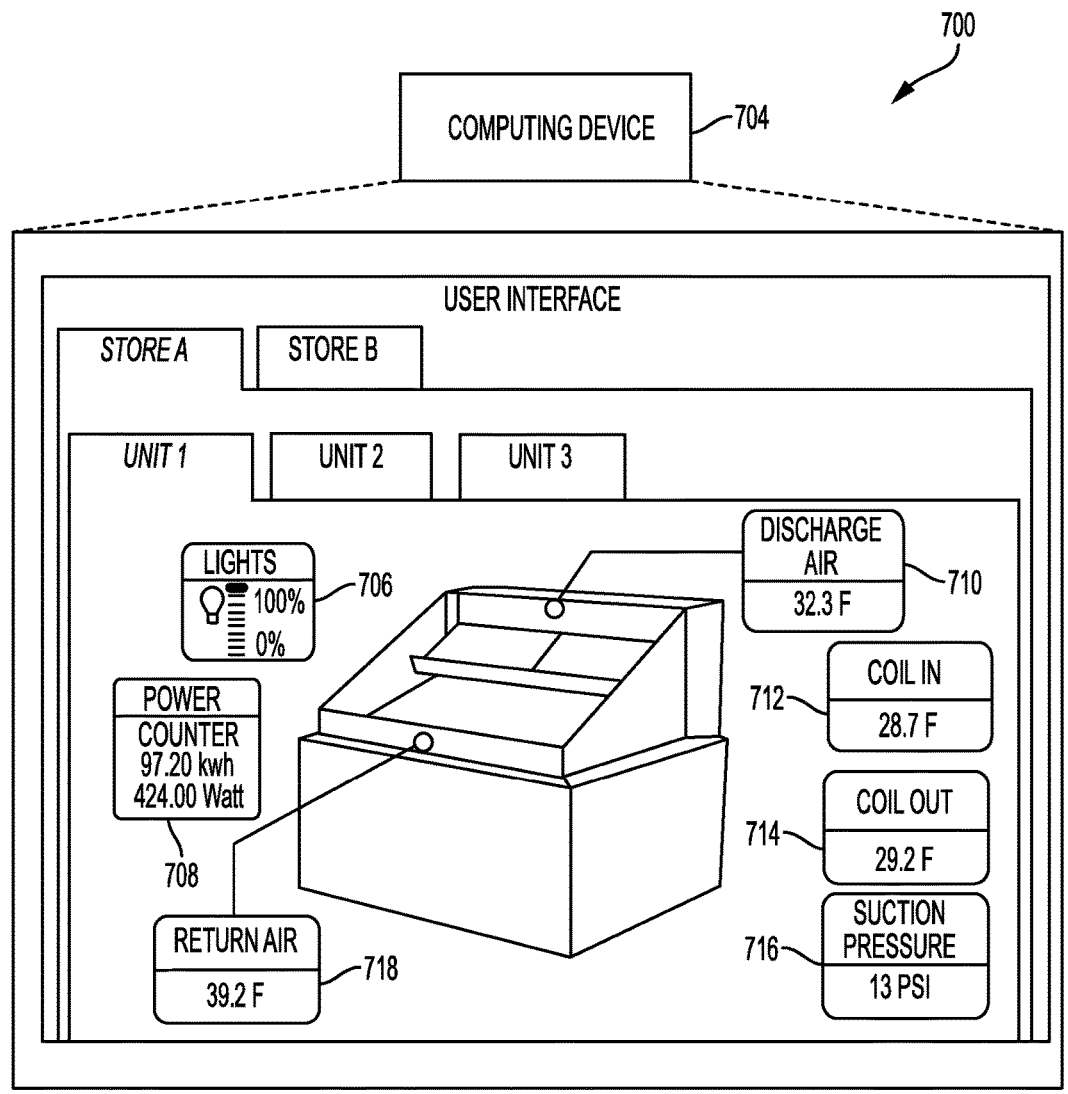

FIG. 6 depicts an event detail notification 602 provided on the user interface 600. The event detail notification 602 can be automatically generated based on the existing of certain conditions within a monitored environment (such as the overheat event 512 or the overcool event 514 illustrated in FIG. 5). The event detail notification 602 may require the user take a certain action, such as acknowledge the existence of the event. In some embodiments, the event detail notification 602 can be provided through other notification techniques, such as an email message, a text message, an automated telephone message, and so forth.

FIG. 7 depicts a graphical user interface 700 that graphically shows the unit being monitored 702. In the illustrated embodiment, the unit being monitored 702 is shown to be located at Store A. By selecting the Store B tab, a user can view the status of units at other locations. A variety of statuses are graphically provided to the user, including a lighting level 706, a power consumption level 708, a discharge air temperature 710, a coil in temperature 712, a coil out temperature 714, a suction pressure 716, and a return air temperature 718. As is to be appreciated, depending on the type of unit being monitored, the type of protected article stored in the unit, and the type of sensors that are deployed, the statuses that are graphically provided to the user can vary based on implementation. For instance, for data center monitoring, humidity information can be provided through the graphical user interface 700. For a medical storage facility, air quality information can be provided through the graphical user interface 700.

Figure 8:
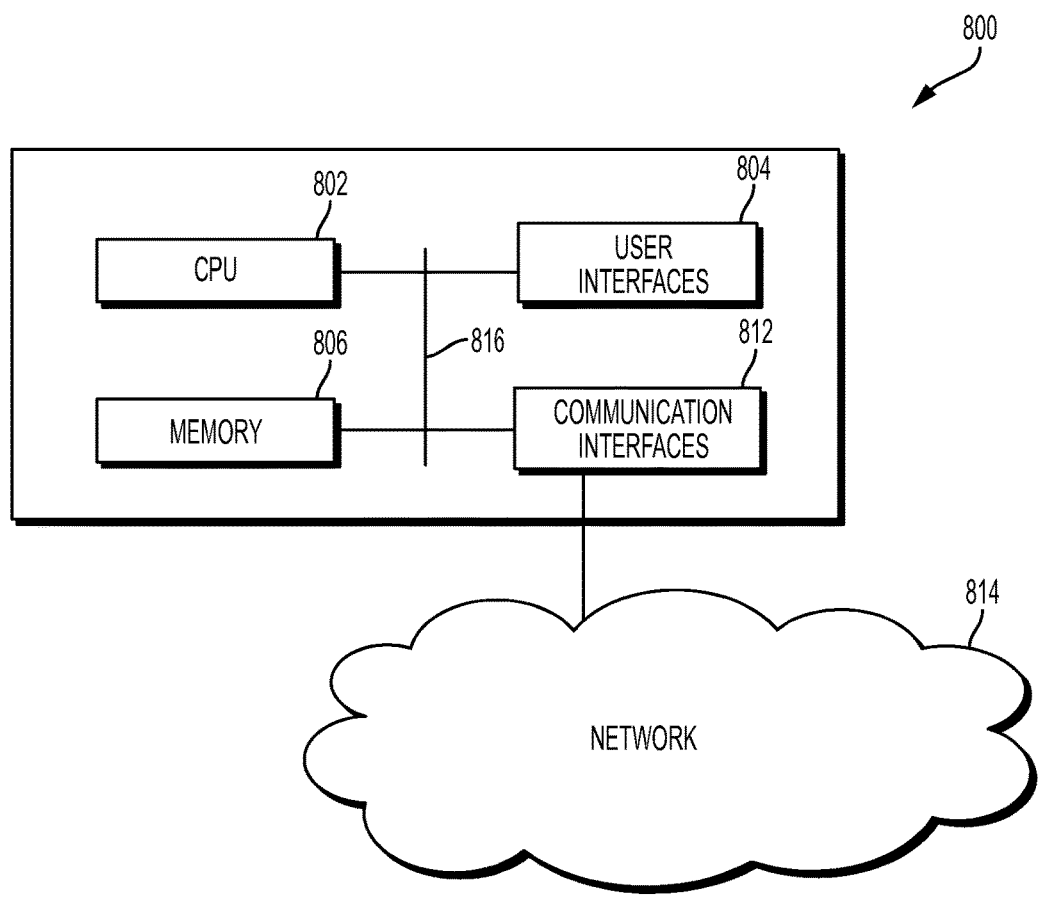
FIG. 8 depicts an example computing device.

The processes described herein can be performed on or between one or more computing devices. Referring now to FIG. 8, an example computing device 800 is presented. A computing device 800 can be a server, a computing device that is integrated with other systems or subsystems, a mobile computing device, a cloud-based computing capability, and so forth. The computing device 800 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, an environmental surveillance computing system 108, 208, 308, 408, computing device 104, 204, 304, 404, 504, 604, 704, access point 120A, 120B, 220, 320, 420, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 800 includes a processor 802 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 800 also includes one or more memories 806, for example read only memory (ROM), random access memory (RAM), cache memory associated with the processor 802, or other memories such as dynamic RAM (DRAM), static ram (SRAM), programmable ROM (PROM), electrically erasable PROM (EEPROM), flash memory, a removable memory card or disk, a solid state drive, and so forth. The computing device 800 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 802, or memories 806 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 812 can be configured to transmit to, or receive data from, other computing devices 800 across a network 814. The network and communication interfaces 812 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 812 can include wired data transmission links such as Ethernet and TCP/IP. The communication interfaces 812 can include wireless protocols for interfacing with private or public networks 814. For example, the network and communication interfaces 812 and protocols can include interfaces for communicating with private wireless networks such as a WiFi network, one of the IEEE 802.7x family of networks, or another suitable wireless network. The network and communication interfaces 812 can include interfaces and protocols for communicating with public wireless networks 812, using for example wireless protocols used by cellular network providers, including Code Division Multiple Access (CDMA) and Global System for Mobile Communications (GSM). A computing device 800 can use network and communication interfaces 812 to communicate with hardware modules such as a database or data store, or one or more servers or other networked computing resources. Data can be encrypted or protected from unauthorized access.

In various configurations, the computing device 800 can include a system bus 816 for interconnecting the various components of the computing device 800, or the computing device 800 can be integrated into one or more chips such as programmable logic device or application specific integrated circuit (ASIC). The system bus 816 can include a memory controller, a local bus, or a peripheral bus for supporting input and output devices 804, and communication interfaces 812. Example input and output devices 804 include keyboards, keypads, gesture or graphical input devices, motion input devices, touchscreen interfaces, one or more displays, audio units, voice recognition units, vibratory devices, computer mice, and any other suitable user interface.

The processor 802 and memory 806 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A system, comprising:
    a sensor positioned internal to a monitored climate-controlled environment, wherein the sensor is configured to provide an output based on a condition within the monitored climate-controlled environment;
    a sensor manager positioned external to the monitored climate-controlled environment and in communication with the sensor, wherein the sensor manager is configured to receive the output from the sensor via a first communication link;
    an access point, distinct from and in communication with the sensor manager via a second communication link, wherein the access point is configured to receive environmental data from the sensor manager, and the access point is in direct communication with at least one other sensor manager;
    an environmental surveillance computing system in communication with the access point via a third communication link, wherein the environmental surveillance computing system is configured to:
        receive the environmental data from access point,
        store the received environmental data,
        provide a visualization of the environmental data, and
        detect for an occurrence of a reference environmental condition within the monitored climate-controlled environment;
    an actuator positioned outside of the monitored climate-controlled environment and controlled by the environmental surveillance computing system, the environmental surveillance computing system is further configured to activate the actuator to trigger an alarm proximate to the monitored climate-controlled environment in response to detection of the reference environmental condition within the monitored climate-controlled environment; and
    based on a determination that communications between the environmental surveillance computing system and the access point are interrupted, the access point is configured to:
        detect for occurrence of the reference environmental condition within the monitored climate-controlled environment;
        assume control of the actuator from the environmental surveillance computing system, and
        activate the actuator to trigger the alarm in response to detection of the reference environmental condition.

2. The system of claim 1, wherein the first communication link is a wired communication link and the second communication link is a wireless communication link.

3. The system of claim 1, further comprising a plurality of sensors positioned internal to the monitored climate-controlled environment, wherein each of the plurality of sensors is in communication with the sensor manager via one of a wired communication link or a wireless communication link.

4. The system of claim 3, wherein the plurality of sensors comprise at least one temperature sensor.

5. The system of claim 4, wherein each of the plurality of sensors are temperature sensors.

6. The system of claim 1, wherein the sensor is a pressure sensor, a temperature sensor, a voltage sensor, a current sensor, a sound level sensor, a carbon dioxide level sensor, an air quality sensor, a power consumption sensor, a lighting level sensor, an air flow sensor, or a humidity sensor.

7. The system of claim 1, wherein the sensor manager comprises a photovoltaic module.

8. The system of claim 7, wherein the sensor manager comprises a stored energy source.

9. The system of claim 1, further comprising a plurality of sensors each positioned in a separate respective monitored climate-controlled environment, wherein the sensor manager is in communication with each of the plurality of sensors.

10. The system of claim 1, wherein the environmental surveillance computing system, in response to a trigger of the alarm, presents an event detail notification that requires an acknowledgement action from a recipient of the event detail notification.

11. The system of claim 1, wherein the access point, in response to a trigger of the alarm, presents an event detail notification that requires an acknowledgement action from a recipient of the event detail notification.

12. The system of claim 1, wherein based on the determination that communications between the environmental surveillance computing system and the access point are interrupted, the access point is further configured to:
store data collected from the sensor manager; and
based on a determination that communications between the environmental surveillance computing system and the access point are no longer interrupted, forward the collected data to the environmental surveillance computing system.

13. The system of claim 1, wherein the environmental surveillance computing system, in response to a trigger of the alarm, presents an event detail notification that requires an acknowledgement action from a recipient of the event detail notification.

14. The system of claim 1, wherein the access point, in response to a trigger of the alarm, presents an event detail notification that requires an acknowledgement action from a recipient of the event detail notification.

15. A system for monitoring an environment, comprising:
a sensor manager positioned external to a monitored environment, comprising:
a sensor interface,
an energy harvester, and
a network interface;
a plurality of sensors positioned internal to the monitored environment and remote from the sensor manager, wherein the plurality of sensors are communicatively coupled to the sensor manager via the sensor interface and are configured to provide environmental data to the sensor manager based on at least one condition sensed within the monitored environment;
an access point distinct from and communicatively coupled to the sensor manager via the network interface, wherein the access point is configured to receive the environmental data from the sensor manager, and the access point is in direct communication with at least one other sensor manager;
an environmental surveillance computing system communicatively coupled to the access point, wherein the environmental surveillance computing system is configured to:
receive the environmental data from the access point, and
detect for an occurrence of a reference environmental condition within the monitored environment;
an actuator positioned outside of the monitored environment and controlled by the environmental surveillance computing system, the environmental surveillance computing system is further configured to activate the actuator to trigger an alarm proximate to the monitored environment in response to detection of the reference environmental condition within the monitored environment;
based on a determination that communications between the environmental surveillance computing system and the access point are interrupted, the access point is configured to:
store additional environmental data from the sensor manager during the interruption,
detect for occurrence of the reference environmental condition within the monitored environment,
assume control of the actuator from the environmental surveillance computing system,
activate the actuator to trigger the alarm in response to detection of the reference environmental condition, and
based on another determination that communications between the environmental surveillance computing system and the access point is no longer interrupted:
provide the additional environmental data to the environmental surveillance computing system, and
the environmental surveillance computing system is further configured to provide a visualization based on the additional environmental data.

16. The system of claim 15, wherein the energy harvester is a photovoltaic module.

17. The system of claim 15, wherein at least one of the plurality of sensors is a thermistor probe.

18. The system of claim 15, wherein the monitored environment is a monitored climate-controlled environment and the plurality of sensors are positioned in the monitored climate-controlled environment.

19. The system of claim 15, wherein the plurality of sensors is at least one of a pressure sensor, a temperature sensor, a voltage sensor, a current sensor, a sound level sensor, a carbon dioxide level sensor, an air quality sensor, a power consumption sensor, a lighting level sensor, an air flow sensor, or a humidity sensor.

* * * * *